(12) United States Patent
Chen et al.

(10) Patent No.: US 8,077,467 B2
(45) Date of Patent: Dec. 13, 2011

(54) MOUNTING APPARATUS FOR DISK DRIVE

(75) Inventors: Yun-Lung Chen, Taipei Hsien (TW);
Fa-Ming Jiang, Shenzhen (CN);
Zhong-Hai Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 253 days.

(21) Appl. No.: 12/503,502

(22) Filed: Jul. 15, 2009

(65) Prior Publication Data

US 2010/0172086 A1    Jul. 8, 2010

(30) Foreign Application Priority Data

Jan. 5, 2009   (CN) .......................... 2009 2 0300029

(51) Int. Cl.
*H05K 7/16* (2006.01)

(52) U.S. Cl. .............. 361/726; 361/679.33; 361/679.37; 361/724; 312/223.2; 312/333

(58) Field of Classification Search ............. 361/679.33, 361/679.37, 726
See application file for complete search history.

(56) References Cited

U.S. PATENT DOCUMENTS

| 5,340,340 | A | * | 8/1994 | Hastings et al. | ................. 439/64 |
| 5,588,728 | A | * | 12/1996 | Eldridge et al. | ........... 312/332.1 |
| 6,351,379 | B1 | * | 2/2002 | Cheng | ...................... 361/679.33 |
| 6,407,913 | B1 | * | 6/2002 | Peachey et al. | ........... 361/679.57 |
| 6,603,657 | B2 | * | 8/2003 | Tanzer et al. | ............ 361/679.33 |
| 7,019,965 | B2 | * | 3/2006 | Bradley et al. | ........... 361/679.38 |
| 7,477,511 | B2 | * | 1/2009 | Hsu et al. | ................. 361/679.37 |
| 7,570,484 | B1 | * | 8/2009 | Sivertsen | ................. 361/679.37 |
| 7,623,345 | B2 | * | 11/2009 | Shih | ....................... 361/679.58 |
| 7,701,706 | B2 | * | 4/2010 | Peng et al. | ............. 361/679.37 |
| RE41,514 | E | * | 8/2010 | Behl et al. | .................. 312/223.1 |
| 7,848,096 | B2 | * | 12/2010 | Peng et al. | ............. 361/679.33 |
| 2004/0264146 | A1 | * | 12/2004 | Kerrigan et al. | ............. 361/726 |
| 2005/0111178 | A1 | * | 5/2005 | Bradley et al. | ................ 361/684 |
| 2007/0217142 | A1 | * | 9/2007 | Wagatsuma et al. | .......... 361/685 |
| 2008/0062635 | A1 | * | 3/2008 | Chang | .......................... 361/685 |

* cited by examiner

*Primary Examiner* — Jinhee Lee
*Assistant Examiner* — Anthony Q Edwards
(74) *Attorney, Agent, or Firm* — Altis Law Group, Inc.

(57) ABSTRACT

A mounting apparatus for a disk drive includes a tray, a bracket, and a latch member. The tray supports the disk drive. A resiliently deformable hook is formed on the tray. The tray defines two pair of first and second sliding slots. The bracket receives the tray and the disk drive, and defines a positioning opening. Two pair of posts are formed at two opposite ends of the latch member. The posts slide and rotate in the sliding slots. A positioning tab is formed the latch member and engages in the positioning opening to prevent the tray sliding out of the bracket. A blocking tab is formed on the latch member, and engages with the hook to remain engagement between the positioning tab and the positioning opening, and to disengage from the hook when the hook is deformed.

15 Claims, 5 Drawing Sheets

MOUNTING APPARATUS FOR DISK DRIVE

BACKGROUND

1. Technical Field

The present disclosure relates to mounting apparatuses, and particularly to a mounting apparatus for a disk drive.

2. Description of Related Art

In a hot-plug electronic device such as a computer or a server, a disk drive is secured on a tray, and together with the tray can be inserted in a bracket and drawn out from the bracket by one handle. Usually, the handle is pivotably secured on one side of the tray. When the tray and disk drive are drawn by the handle, force is applied on the one side of the tray, and the tray and the disk drive are biased to rotate in the bracket, which makes it more difficult to draw the tray and disk drive out of the bracket.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
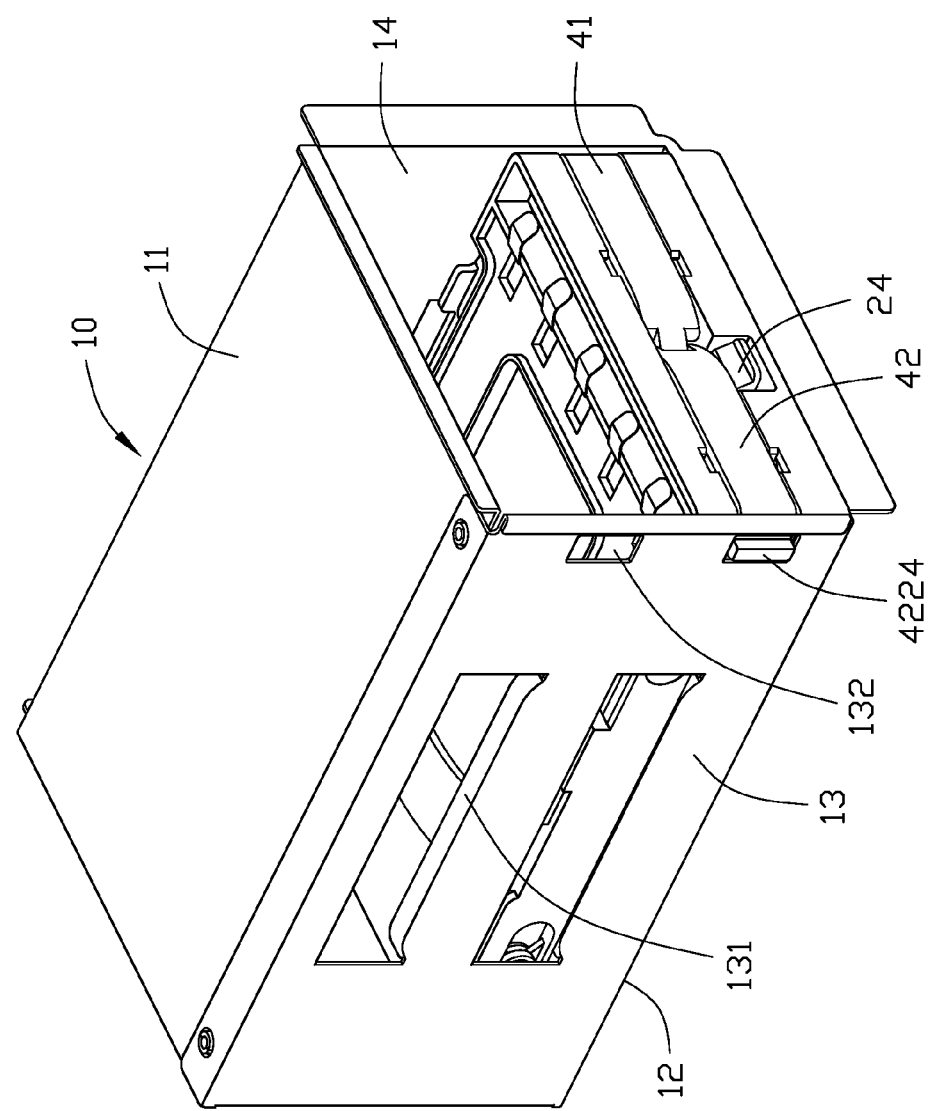
FIG. 1 is an assembled view of an embodiment of a mounting apparatus and a disk drive.
Figure 2:
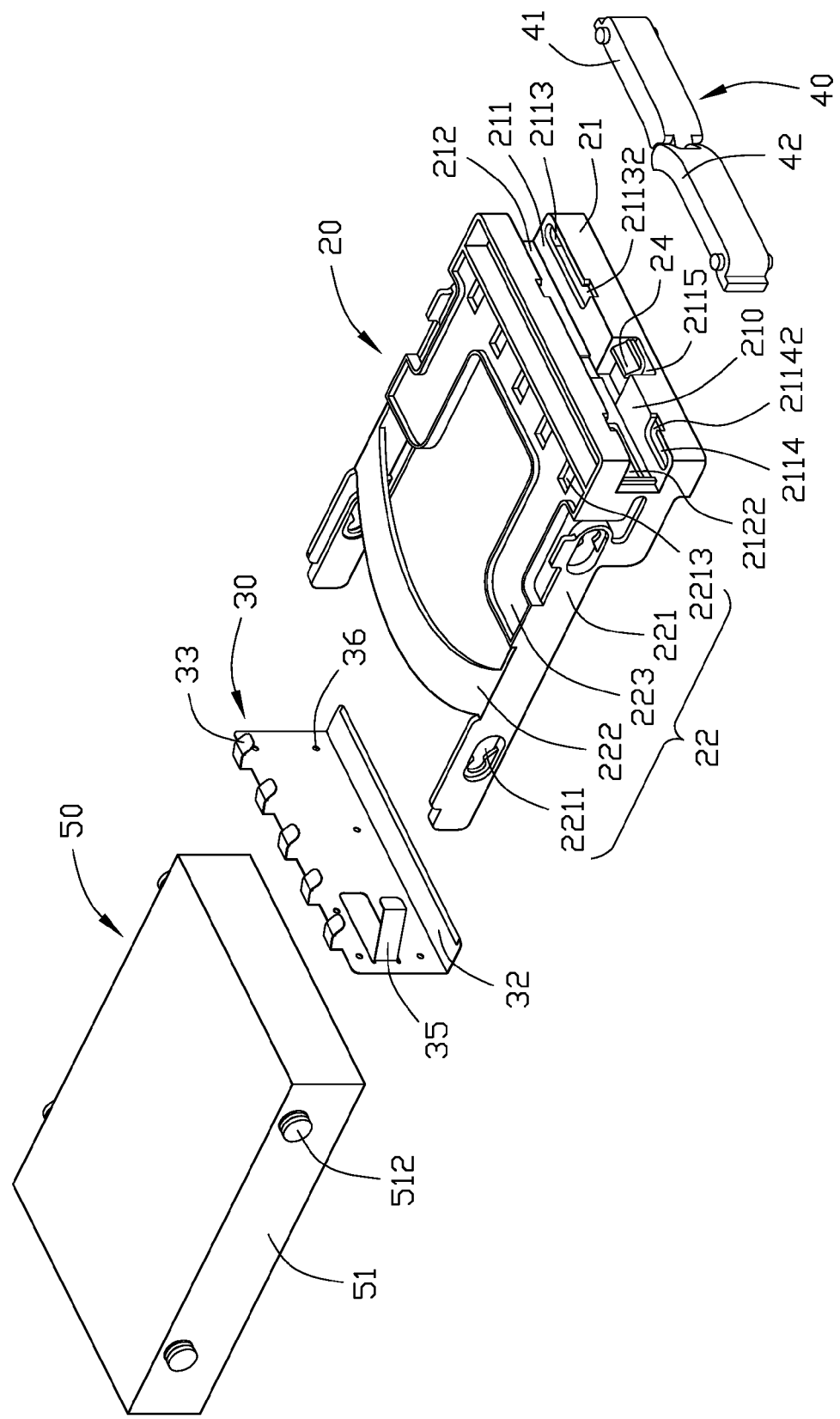
FIG. 2 is an exploded, isometric view of the disk drive, a shielding member, the tray, and a latch member of FIG. 1.
Figure 3:
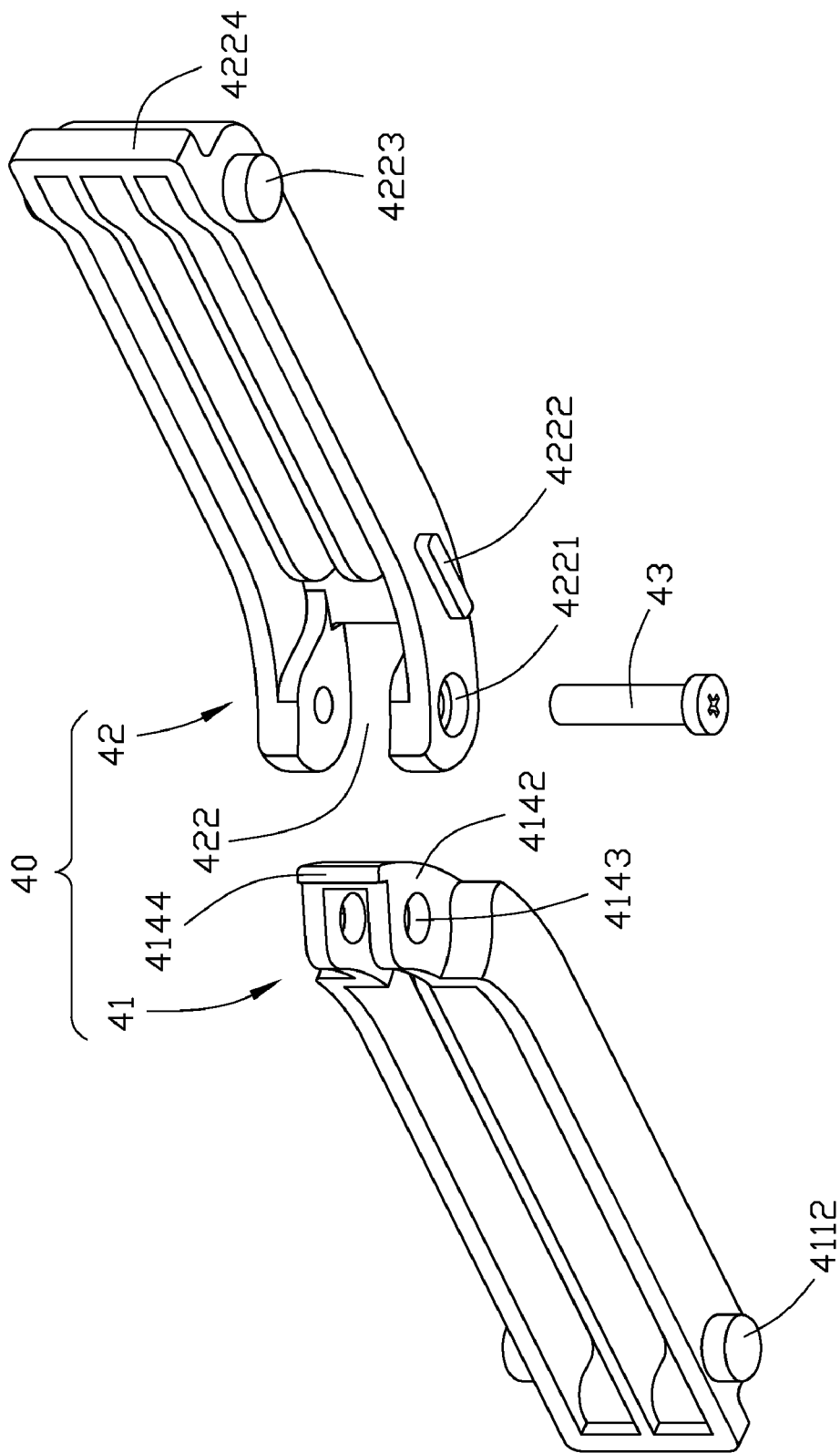
FIG. 3 is an exploded, isometric view of the latch member of FIG. 1.

Referring to FIGS. 1-3, an embodiment of a mounting apparatus is configured to secure a disk drive 50, and includes a bracket 10, a tray 20, and a latch member 40.

The bracket 10 includes a top plate 11, a bottom plate 12 parallel to the top plate 11, and two parallel side plates 14 perpendicular to the top plate 11. A plurality of support flanges 131 is bent in from each of the side plates 13, 14. Two positioning openings 132 are defined in the side plate 13 adjacent front edges thereof.

The tray 20 is configured to be inserted into the bracket 10, and supported by the support flanges 131. The tray 20 includes a base portion 21 and a support portion 22 extending from the base portion 21. A holding slot 210 is defined in the base portion 21, and surrounded by two parallel horizontal walls 211 and a vertical wall 212 perpendicular to the horizontal walls 211. A first sliding slot 2113 and a second sliding slot 2114 are defined in two opposite ends of each horizontal wall 211, each of the first and second sliding slots 2113, 2114 communicates with outside of the base portion 21 via an entry 21132, 21142. An installing slot 2115 is defined in one of the horizontal walls 211 between the first and second sliding slots 2113, 2114. A hook 24 is formed on the base portion 211 in the installing slot 2115, and capable of being resiliently deformed away from the other one horizontal wall 211. A through opening 2122 is defined in the vertical wall 212 adjacent the second sliding slot 2114 of the horizontal wall 211. The support portion 22 includes a base wall 223 and two parallel lateral walls 221 perpendicular to the base wall 223. A plurality of locking holes 2213 is defined in the base wall 223 adjacent the base portion 21. An arc-shaped flange 222 is connected between the lateral walls 221 adjacent the base wall 223. Two securing holes 2211 are defined in the lateral walls 221.

The latch member 40 includes a first handle 41 and a second handle 42 pivotably connected to the first handle 41. A pair of pivot posts 4112 is formed on one end of the first and second handles 41, 42. A protrusion 422 is formed on the other end of the first handle 41, and a pair of pivot holes 4143 is defined in the protrusion 422. A blocking flange 4144 is formed on an edge of the protrusion 422. A pair of pivot posts 4223 and a positioning tab 4224 are formed on one end of the second handle 42, and a receiving opening 422 and a pair of pivot holes 4221 are defined in the other end of the second handle 42. A blocking tab 4222 protrudes from the second handle 42, and is configured to engage with the hook 24 of the tray 20. The receiving opening 422 is configured to receive the protrusion 4142 of the first handle 41. A fastener 43 can be engaged in the pivot holes 4221 of the second handle 42 and the pivot holes 4143, so that the first handle 41 is pivotably connected to the second handle 42. The blocking flange 4144 is configured to limit the rotating range of the first handle 41 relative to the second handle 42.

An EMI shielding member 30 is configured to secure on the tray 20, and includes a base portion 31 and a flange 32 perpendicularly bent from the base portion 31. A plurality of securing holes 36 is defined in the base portion 31. A resilient finger piece 35 and a plurality of finger pieces 33 are bent from the base portion 31, respectively corresponding to the locking holes 2213 and the through opening 2122 of the tray 20.

The tray 20 is configured to secure a disk drive 50. The disk drive 50 includes two parallel side walls 51 perpendicular to the top wall 52. Two securing members 512 are removably attached to the each side wall 51.

Figure 4:
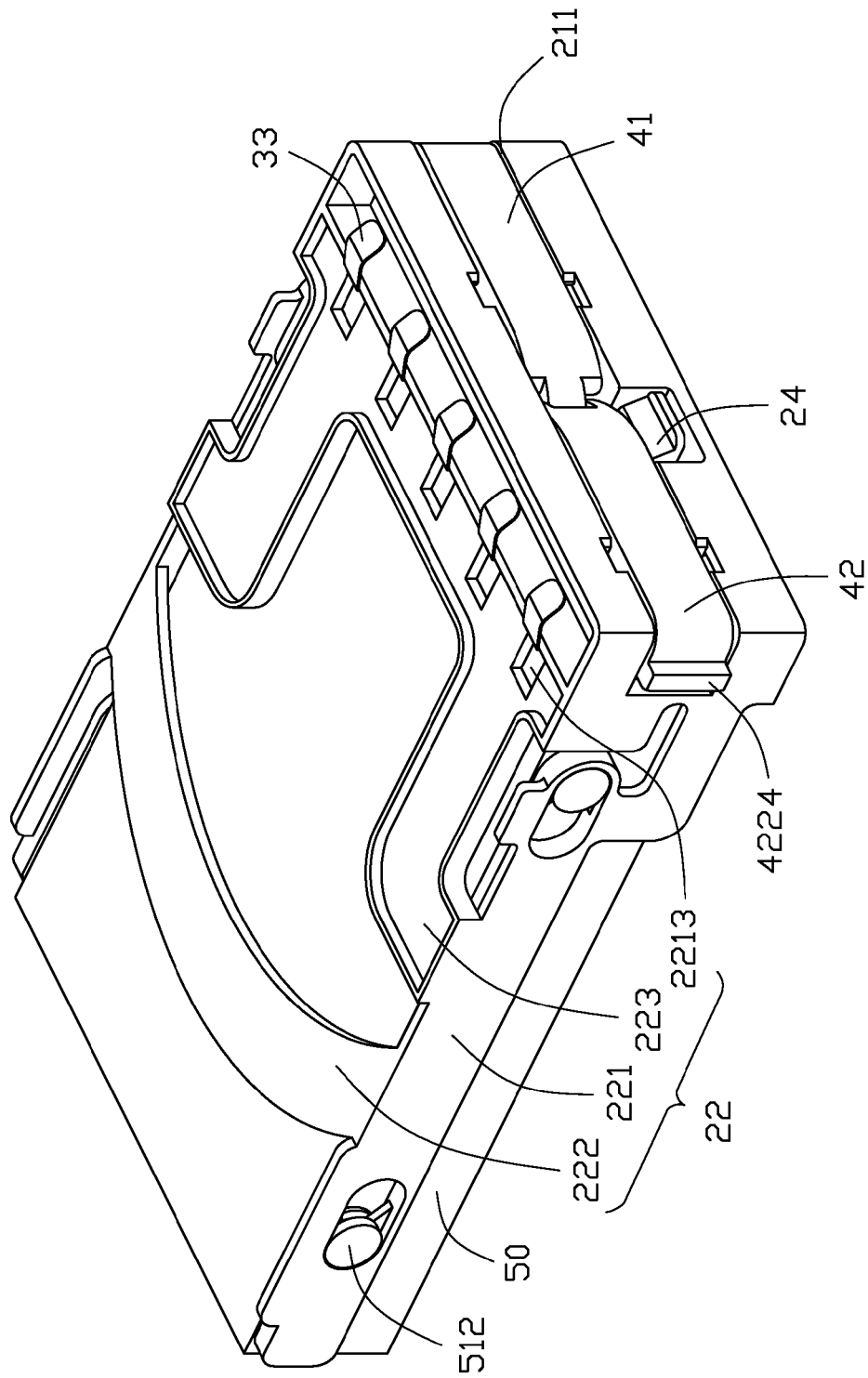
FIG. 4 is an assembled view of FIG. 2, showing the latch member in a locked position.
Figure 5:
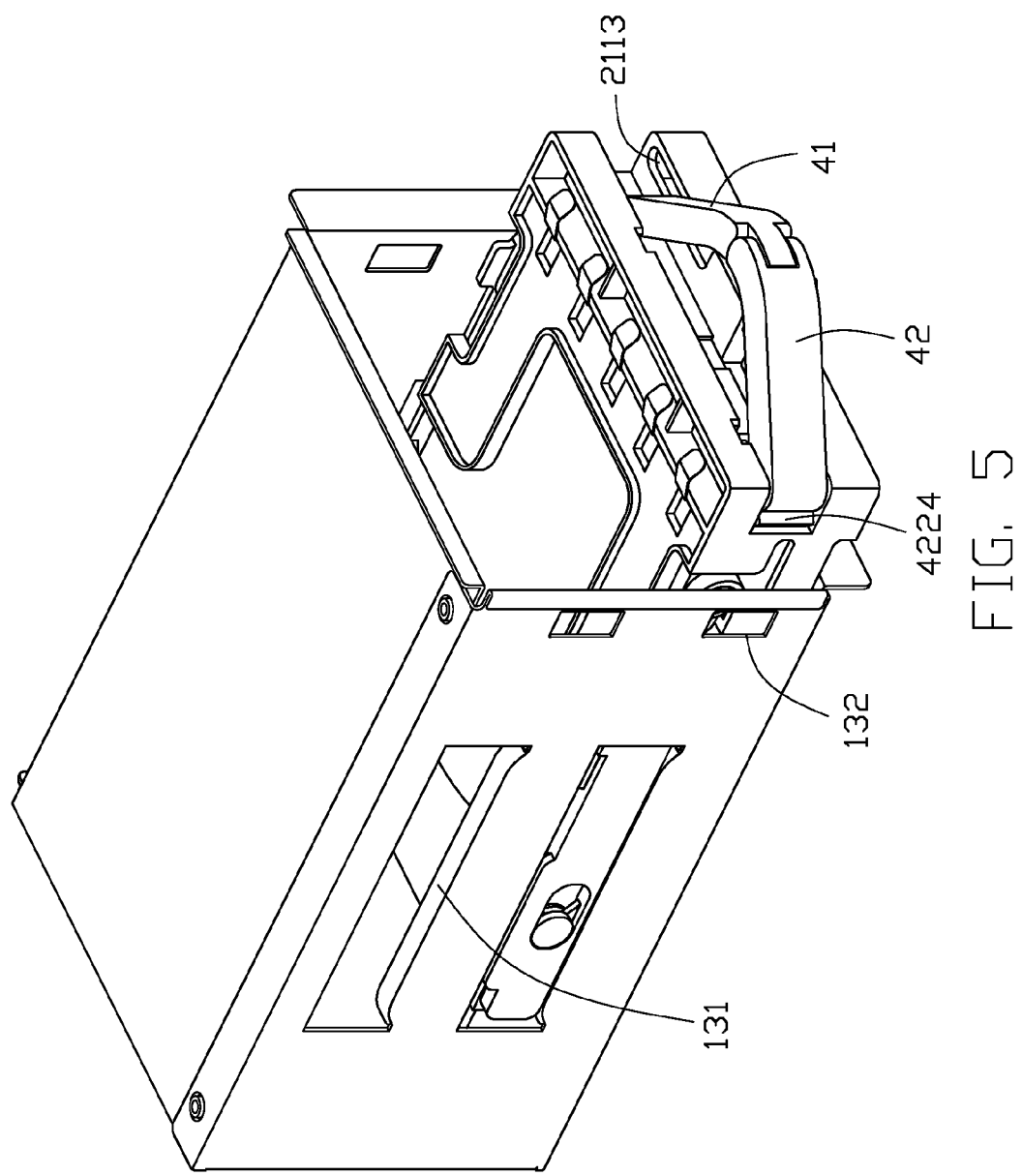
FIG. 5 is similar to FIG. 1, but showing the latch member in an unlocked position.

Referring also to FIGS. 4-5, in assembly of the tray 20, the shielding member 30 and the latch member 40, the finger pieces 33, 35 of the shielding member 30 are respectively engaged in the locking holes 2213 and the through opening 2122 of the tray 20, and the base portion 31 and the flange 32 abut on the base portion 21 of the tray 20. A plurality of fasteners (not shown) is engaged in the securing holes 36 and securing holes (not shown) defined in the base portion 21 of the tray 20. The shielding member 30 is thereby secured to the tray 20.

The pivot posts 4112, 4223 of the first and second handles 41, 42 respectively slide into the first and second sliding slots 2113, 2114 of the tray 20 via the entries 21132, 21142, so that the first and second handles 41, 42 are pivotably and slidably secured in the holding slot 210 of the tray 20. The first and second handles 41, 42 are rotated, until the protrusion 4142 of the first handle 42 is received in the receiving opening 422 of the second handle 42. The pivot holes 4143 of the first handle 41 are aligned with the pivot holes 4221 of the second handle 42. The fastener 43 is then engaged in the pivot holes 4221, 4143, so that the first handle 41 is pivotably connected to the second handle 42, thereby preventing the pivot posts 4112, 4223 disengaging from the sliding slots 2113, 2114 of the tray 20 via the entries 21132, 21142.

The latch member 40 is capable of moving from an unlocked position to a locked position. When the latch member 40 is positioned in the unlocked position, the first and second handles 41, 42 are rotated out from the holding slot 210. The blocking flange 4144 of the first handle 41 abuts against an edge of the receiving opening 422 of the second handle 42, to prevent the first handle 41 from further rotating relative to the second handle 42. The pivot posts 4112 of the first handle 41 are slid to a position adjacent the entries 21132 of the sliding slots 2113 from a position away from the entries 21132. The finger piece 35 of the shielding member 30 abuts against the second handle 42. The positioning tab 4224 is positioned in the holding slot 210. When the latch member 40 is positioned in the locked position, the first and second handles 41, 42 are rotated in the holding slot 210. The pivot posts 4223 are slid from the position adjacent the entries 21132 to the position away from the entries 21132. The finger piece 35 of the shielding member 30 is pressed by the second handle 42 and resiliently deformed. The blocking tab 4222 engages with the hook 24 to block the second handle 42 from rotating out of the holding slot 210.

The disk drive 50 is placed on the base wall 223 and the arc-shaped flange 222 of the support portion 22 of the tray 20, and sandwiched between the lateral walls 221. The top wall 52 abuts on the base wall 223 and the arc-shaped flange 222. The fasteners 512 are secured in the securing holes 2211 of the lateral walls 221, so that the disk drive 50 is fixed on the tray 20.

In assembling the disk drive 50 in the bracket 10, the latch member 40 is positioned in the unlocked position, and then the tray 20 and the disk drive 50 are together inserted into the bracket 10 and supported on the support flange 131, until the positioning tab 4224 is positioned corresponding to the positioning opening of the side wall 13 of the bracket 10. The latch member 40 is moved from the unlocked position to the locked position. The positioning tab 4224 is rotated out of the holding slot 210 and engaged in the positioning opening, so as to prevent the tray 20 and the disk drive 50 sliding out from the bracket 10. Thus, the tray 20 and the disk rive 50 are secured in the bracket.

In disassembling the disk drive 50 from the bracket 10, the hook 24 is pressed down to resiliently deform and to disengage from the blocking tab 4222 of the second handle 42. The finger piece 35 of the shielding member 30 thereby rebounds to rotate the second handle 42 out of the holding slot 210 until the latch member 40 is moved from the locked position t to the unlocked position. The positioning tab 4224 is disengaged from the positioning opening 132 of the bracket 10 and rotated in the holding slot 210, so that the tray 20 and the disk drive 50 can be drawn out from the bracket 10.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a disk drive comprising:
a tray configured for supporting the disk drive, and a resiliently deformable hook located on the tray;
a bracket configured for receiving the tray and the disk drive therein, the bracket defining a positioning opening therein;
a first handle pivotably secured on the tray;
a second handle pivotably secured on the tray and pivotably connected with the first handle, wherein the first handle is rotatable, relative to the second handle, to a locked position, in which the first and second handles are rotated in the tray, and an unlocked position, in which the first and second handles are rotated out of the tray;
a positioning tab formed on one of the first and second handles, the positioning tab being configured to engage in the positioning opening when in the locked position; and
a blocking tab formed on one of the first and second handles, the blocking tab configured to engage with the hook of the tray when the first or second handles is in the locked position so as to remain engagement between the positioning tab and the positioning opening, and to disengage from the hook when the first or second handles is in the unlocked position so that the positioning tab is disengaged from the positioning opening.

2. The mounting apparatus of claim 1, wherein the tray defines a holding slot configured for receiving the first and second handles; the positioning tab is rotated in the holding slot when the blocking tab disengages with the hook.

3. The mounting apparatus of claim 2, wherein the tray defines first and second sliding slots therein, a pair of pivot posts is formed on the first and second handles and configured to pivotably and slidably engage in the first and second sliding slots.

4. The mounting apparatus of claim 3, wherein each of the first and second sliding slots has an entry configured for accepting the pivot posts.

5. The mounting apparatus of claim 3, wherein the tray defines a through opening communicating with the second sliding slot; a shielding member is secured to the tray with a finger piece extending in the second sliding slot.

6. The mounting apparatus of claim 5, wherein the finger piece is pressed to resiliently deform when the first or second handles is in the locked position, and rebounds to rotate on of the first and second handles when the first or second handles is in the unlocked position.

7. The mounting apparatus of claim 1, wherein a blocking flange is formed on one of the first and second handles and configured to engage with the other one of the first and second handles so that limit rotating range of the first handle relative to the second handle in the unlocked position.

8. The mounting apparatus of claim 1, wherein a protrusion extends from the first handle, a receiving opening is defined in the second handle, and the protrusion is rotatably received in the receiving opening.

9. A mounting apparatus for a disk drive comprising:
a tray configured for supporting the disk drive, a resiliently deformable hook being formed on the tray, the tray defining two pairs of first and second sliding slots at two opposite ends;
a bracket configured for receiving the tray and the disk drive therein, the bracket defining a positioning opening therein;
a latch member comprising a first handle and a second handle, the second handle is rotatable relative to the first handle and connected to the second handle, two pair of posts located at the first handle and the second handle, the post configured to slide and rotate in the sliding slots of the tray, and
a positioning tab formed the latch member and configured to engage in the positioning opening of the bracket so as to prevent the tray sliding out of the bracket, a blocking tab formed on the latch member, the blocking tab is configured to engage with the hook of the tray so as to remain engagement between the positioning tab and the positioning opening, and to disengage from the hook when the hook is deformed.

10. The mounting apparatus of claim 9, wherein a protrusion extends from the first handle, a receiving opening is defined in the second handle, and the protrusion is rotatably received in the receiving opening.

11. The mounting apparatus of claim 10, wherein a blocking flange is formed on one of the first and second handles, and configured to engage with the other one of the first and second handles to limit rotating range of the first handle relative to the second handle.

12. The mounting apparatus of claim 9, wherein the tray defines a holding slot configured for receiving the first and second handles; the positioning tab is rotated in the holding slot when the blocking tab disengages with the hook.

13. The mounting apparatus of claim 9, wherein each of the first and second sliding slots has an entry configured for accepting the pivot posts of the first and second handles.

14. The mounting apparatus of claim 9, wherein the tray defines a through opening communicating with the second sliding slot; a shielding member is secured to the tray with a finger piece extending in the second sliding slot.

15. The mounting apparatus of claim 14, wherein the finger piece is pressed to resiliently deform when the blocking tab engages with the hook, and rebounds to push the first and second handles when the blocking tab disengages from the hook.

* * * * *